(12) United States Patent
Friedman et al.

(10) Patent No.: US 12,456,550 B2
(45) Date of Patent: Oct. 28, 2025

(54) SYSTEMS AND METHODS FOR REMOTE PATIENT MONITORING

(71) Applicant: Tenovi, Co., Irvine, CA (US)

(72) Inventors: Nizan Friedman, Irvine, CA (US); Daniel K. Zondervan, Irvine, CA (US)

(73) Assignee: Tenovi, Co., Portsmouth, NH (US)

( * ) Notice: Subject to any disclaimer, the term of this patent is extended or adjusted under 35 U.S.C. 154(b) by 216 days.

(21) Appl. No.: 17/864,563

(22) Filed: Jul. 14, 2022

(65) Prior Publication Data
US 2023/0013837 A1 Jan. 19, 2023

Related U.S. Application Data

(60) Provisional application No. 63/221,630, filed on Jul. 14, 2021.

(51) Int. Cl.
*G16H 40/67* (2018.01)

(52) U.S. Cl.
CPC .................. *G16H 40/67* (2018.01)

(58) Field of Classification Search
CPC ................ G16H 40/67; G06Q 50/20–26
See application file for complete search history.

(56) References Cited

U.S. PATENT DOCUMENTS

| | | | | |
|---|---|---|---|---|
| 9,176,641 B1* | 11/2015 | Dixon, III | ........... | G06F 3/04883 |
| 2014/0368352 A1* | 12/2014 | Benjamin | .............. | G16H 70/60 |
| | | | | 340/870.02 |
| 2015/0051462 A1* | 2/2015 | Olsen | ..................... | A61B 5/743 |
| | | | | 600/323 |
| 2015/0269348 A1* | 9/2015 | Madjd | .................... | G16H 50/30 |
| | | | | 705/2 |
| 2015/0363563 A1* | 12/2015 | Hallwachs | ............ | G16H 40/67 |
| | | | | 705/3 |
| 2019/0246344 A1* | 8/2019 | Prasad | .................. | H04W 8/005 |
| 2022/0398452 A1* | 12/2022 | Subramanian | ......... | G16H 50/70 |

OTHER PUBLICATIONS

Soleymanian et al., Sensor Data, Privacy, and Behavioral Tracking: Does Usage-Based Auto Insurance Benefit Drivers?, 38(1) Marking Science (Jan. 2017) (Year: 2017).*
Chen et al., Edge Computing Gateway of the Industrial Internet of Things Using Multiple Collaborative Microcontrollers, 32(1) IEEE Network 24-32 (Jan. 26, 2018) (Year: 2018).*

* cited by examiner

*Primary Examiner* — Jordan L Jackson
(74) *Attorney, Agent, or Firm* — Risley IP; David R. Risley

(57) ABSTRACT

The present disclosure presents systems and methods for remote patient monitoring. One such system or method is adapted to configuring a gateway device to supply remote patient monitoring data for peripheral monitoring devices of an individual patient, wherein the remote patient monitoring data comprises measurement values of the peripheral monitoring devices; configuring one or more parameters for tracking compliance of supplying of the remote patient monitoring data to a healthcare provider of the patient; tracking times at which remote patient monitoring data is received from the gateway device for individual peripheral monitoring devices of the patient and supplied to the healthcare provider via a dashboard graphical interface; and transmitting to the gateway device of the patient an alert signal that causes a status display indicator on the gateway device to indicate that a new remote patient monitoring data is requested for the particular peripheral monitoring device.

20 Claims, 19 Drawing Sheets

FIG. 4

Fulfillment Dashboard

🔍 Search Device, Patient or Client

◉ Pending Requests (22)  ○ Fulfilled Requests  ○ All Requests

| Client | Device Name | Gateway ID ⓘ | Ship To ⓘ | Address | Requested On ∨ | Status | |
|---|---|---|---|---|---|---|---|
| ACME | Tenovi Pulse Ox | N/A | Bennett Charles | 1 Rose Street New City NY, 12345 | ?/?/22, 2:00 AM | Pending | ⋮ |
| ACME | Tenovi Pulse Ox | N/A | Daphne Erickson | 2 Sycamore Dr. Montgomery NY, 12345 | ?/?/22, 2:00 AM | Pending | ⋮ |
| ACME | Tenovi BPM | N/A | Fred Gunnerson | 3 Ivy Lane New City NY, 12345 | ?/?/22, 2:00 AM | Pending | ⋮ |
| ACME | Tenovi | N/A | Harper Ingles | 4 Fescue Circle Montgomery NY, 12345 | ?/?/22, 2:00 AM | Pending | ⋮ |

Nizan Friedman

SYSTEMS AND METHODS FOR REMOTE PATIENT MONITORING

CROSS-REFERENCE TO RELATED APPLICATION

This application claims priority to U.S. provisional application entitled, "SYSTEMS AND METHODS FOR REMOTE PATIENT MONITORING," having Ser. No. 63/221,630, filed Jul. 14, 2021, which is entirely incorporated herein by reference.

BACKGROUND

Remote patient monitoring (RPM) can empower patients to better manage their health and participate in their health care. When used by clinicians, RPM can provide a more holistic view of a patient's health over time, increase visibility into a patient's adherence to a treatment, and enable timely intervention before a costly care episode. Clinicians can strengthen their relationships with, and improve the experience of, their patients by using the data sent to them via RPM to develop a personalized care plan and to engage in joint decision-making to foster better outcomes. To encourage remote patient monitoring efforts, the American Heart Association supports initiatives that increase access to and incentivize the appropriate design and use of evidence-based remote patient monitoring technologies. Accordingly, the Centers for Medicare/Medicaid Services (CMS) announced in the 2019 Medicare Physician Fee Schedule Final Rule that it would reimburse RPM monitoring devices and/or services that are capable of complying with certain remote monitoring requirements. Thus, there is a need for supportive services that facilitate the provision of remote patient monitoring services while also meeting healthcare guidelines.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4-17 shows exemplary graphical user interfaces to a web application for facilitate management care and compliance with healthcare guidelines related to remote patient monitoring in accordance with various embodiments of the present disclosure.

DETAILED DESCRIPTION

The present disclosure relates to systems and methods for remote patient monitoring. In general, systems and methods of the present disclosure provide hardware, software, and integration tools to automate and visualize patient vitals for remote patient monitoring while also facilitating and documenting compliance with applicable healthcare guidelines.

Figure 1:
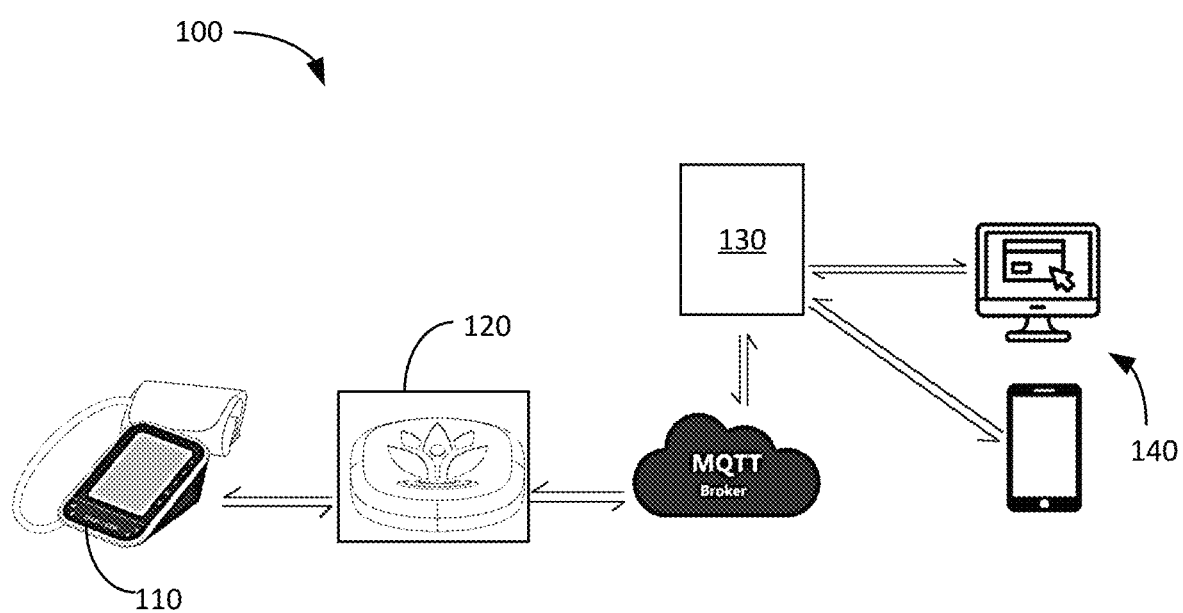
FIG. 1 shows a block diagram of an example environment suitable for practicing the systems and methods of the present disclosure.

FIG. 1 shows a block diagram of an example environment 100 suitable for practicing the systems and methods described herein. It should be noted, however, that the environment 100 is just one example and is a simplified embodiment provided for illustrative purposes, and reasonable deviations of this embodiment are possible as will be evident to those skilled in the art. As shown in FIG. 1, the environment 100 may include at least one peripheral monitoring device 110, at least one gateway device 120, at least one server 130, and at least one client computing device ("client") 140. In various embodiments, the client(s) 140 includes, but is not limited to, a laptop computer, a tablet computer, a desktop computer, a mobile phone, and so forth. The client(s) 140 can include any appropriate device having network functionalities allowing the client(s) 140 to communicate to server(s) 130. In some embodiments, the client(s) 140 can be connected to the server(s) 130 via one or more wired or wireless communications networks. In some embodiments, the server(s) 130 may include a standalone computing device. In some other embodiments, the server(s) 130 may be implemented as a cloud-based computing resource shared by multiple users. The cloud-based computing resource(s) can include hardware and software available at a remote location and accessible over a network (for example, the Internet). The cloud-based computing resource(s) can be dynamically re-allocated based on demand. The cloud-based computing resources may include one or more server farms/clusters including a collection of computer servers which can be co-located with network switches and/or routers.

In various embodiments, the gateway device 120 is configured to automatically connect to one or more peripheral monitoring devices 110 (e.g., within a home or office of a patient is remote from the server 130 and clients 140) that measure physiological parameters of the patient through short range communication, such as those involving one or more Bluetooth protocols. The gateway device 120 is configured to receive incoming data packets from the peripheral monitoring device(s) 110 and may perform functions to analyze the incoming data locally. The gateway 120 may also send data packets back to the peripheral monitoring device 110 in order to perform functions such as setting the time or other settings on the peripheral monitoring device 110.

In an exemplary embodiment, a near file communication (e.g., Bluetooth) connection process between the gateway 120 and the peripheral monitoring device 110 can be divided into two main steps. In the first, the gateway device 120 scans for advertising peripheral monitoring devices 110. Once the gateway device 120 has found a target peripheral monitoring device 110, the two devices will negotiate their connection and (if applicable) pairing. Scan filtering is a nontrivial problem for a gateway that is designed to operate with many different types of peripheral monitoring devices, particularly when there might be more than one peripheral monitoring device of a given type in the same vicinity (e.g., there are two or more patients in the same household or care facility, each using their own gateway device 120). The gateway device 120 solves this problem using a novel scan management system that requires no action on the part of the end user under normal circumstances.

By default, the gateway device 120 is configured to scan for supported peripheral monitoring devices 110 based on the device-type specific information included in advertising packets. This is referred to as permissive scanning. In various embodiments, The logic of the gateway device 120 maintains a table of currently connected device types. Multiple simultaneous connections are supported, based on the type of the connected device, as scan filters can be automatically adjusted to prevent subsequent connections to redundant device types. When multiple gateways 120 are operating in range of one another, a scan manager logic of the gateway 120 can switch from a permissive scanning paradigm to a restrictive scanning paradigm. When there is at least one peripheral monitoring device 110 stored in a restricted list, the gateway 120 is configured to scan only based on the contents of the restricted list. When the restrictive scanning paradigm is active, the status display indicator that is located on an exterior side of a protective case (e.g., a top side) for the gateway device 120 is illuminated in a static white pattern. Peripheral monitoring devices can also be directly added to or removed from the restricted list using commands received from a button interface ("button") located on an external surface of the protective case for the gateway device 120. In various embodiments, pressing and holding the button will initiate a restrictive scan that can be used to add approved nearby devices to the restricted list. During a restrictive scan, the status display indicator is illuminated with white pulses to indicate its state. The restricted list can also be optionally synchronized with the server 130, allowing peripheral monitoring devices to be added and removed based on clinician device prescriptions, such that no patient involvement may be needed to program the restricted list.

In various embodiments, scan manager logic of the gateway device 120 is configured to detect other gateways in the vicinity. The presence of overlapping gateways can be used to remotely determine the need for the gateway device 120 to switch from permissive scanning to restrictive scanning. In certain implementations, peripheral monitoring devices can be added to the restricted list of a gateway before the gateway is provided to patients or care facilities by a gateway provider.

In various embodiments, the gateway 120 is configured to send incoming peripheral data (e.g., RPM measurement data) through far field communications, such as cellular communications (e.g. via a variety of protocols such as LTE-M and NB-IOT) or WiFi communications, to the server 130. When a new measurement is received by the gateway 120 from a peripheral monitoring device 110, the peripheral data is immediately added to an outgoing measurement queue of the gateway device 120, where the gateway will attempt to drain the queue by sending measurements over the cellular interface to the server 130 whenever a new measurement is added to the queue. In various embodiments, communications between the gateway 120 and server 130 can be routed through an MQTT broker that serves as an intermediate entity between the gateway device 120 and the server 130. The server 130 can then send or relay peripheral data to a client computing device 140, such as a computing device of the patient's physician or care facility.

Various types of peripheral monitoring devices 110 can be employed in the environment 100, such as implantable sensors, biosensors, blood pressure cuffs, glucometers, and pulse oximetry, as well as sensors that collect data passively (e.g., beacons in a home that can transmit data on movement and specific activity/inactivity) and they are most often used in a post-discharge setting or between routine office visits. In accordance with embodiments of the present disclosure, multiple peripheral monitoring devices can be connected to an individual gateway, where each connected device is of a different type. In this way, a single blood pressure device can be connected, a single glucometer device can be connected, and so on.

In various embodiments, the server 130 is configured to verify remote patient monitoring (RPM) measurements that fall outside of predetermined parameters and issue appropriate alerts to patients and/or healthcare providers. In various embodiments, a web application is hosted by the server 130 and made available to client computing device(s) 140. In an exemplary implementation, the server provides a frontend user interface for allowing health care providers, remote patient monitoring providers (that service the healthcare providers) or gateway providers (that service the health care providers and/or remote patient monitoring providers) to set the predetermined parameters and customize the alert settings via client computing device(s) 140. In various embodiments, the predetermined parameters can be set on a global basis, where they apply to all measurements of patients for a physician or healthcare facility, or an individual basis, where they only apply to individual patients. Additionally, the predetermined parameters can be set individually for different RPM metrics and/or devices. Accordingly, the server 130 can check to see if new incoming peripheral data from a gateway 120 fall outside of predetermined parameters set for the patient. Correspondingly, the server 130 can send an electronic message or other notification to the patient instructing them to retake their last measurement if it fell or occurred outside of the predetermined parameters.

In various implementations, the predetermined parameters can include various rule-based data processing features, including comparing if the last measurement, a percentage of a last number of measurements, a mean of a last number of measurements, or a range of a last number of measurements, are greater then, less than, or equal to a threshold value. Such parameters can include or exclude certain measurements based on another set of rules, for example to ignore a measurement outside of a possible human physiological range.

In various cases, rules can be set for a maximum amount time in which a second measurement must be taken after a first measurement falls or occurs outside of the predetermined parameter in order for the second measurement to trigger an alert. Additionally, the server 130 can be programmed to send an electronic message or other notification to a patient and/or healthcare provider in the event that both of a patient's last two measurements (or some other set number) fell or occurred outside of the predetermined parameters. In various embodiments, the method or type of electronic message or notification used by the server 130 and the recipients of those messages can also be configured by an authorized user of the server 130. As such, the electronic messages sent by the server can include SMS messages, emails, automated phone calls, or proprietary messages sent to the gateway device 120.

In the event that the server 130 has triggered an alert for the patient, the server 130 can send a command (e.g., alert signal) to the gateway device 120 for the patient to display an alert on its status display indicator, such as flashing red and making an auditory beep sound, indicating to the user that they must take a second measurement to validate that their measurement is out of range. If the second measurement is out of range, the gateway device 120 can be caused, by the server 130, to flash red and provide additional auditory cues alerting the patient that they must call their healthcare provider.

As previously discussed, certain costs related to remote monitoring procedures can be covered by healthcare insurance providers if certain requirements are able to be met and documented. For example, the Centers for Medicare/Medicaid Services (CMS) announced in the 2019 Medicare Physician Fee Schedule Final Rule that it would reimburse three new RPM codes: (1) CPT 99453: Remote monitoring of physiologic parameter(s) (e.g., weight, blood pressure, pulse oximetry, respiratory flow rate), initial; set-up and patient education on use of equipment; (2) CPT 99454: Remote monitoring of physiologic parameter(s) (e.g., weight, blood pressure, pulse oximetry, respiratory flow rate), initial; each 30 days; and (3) CPT 99457: Remote physiologic monitoring treatment management services, 20 minutes or more of clinical staff/physician/other qualified health care professional time in a calendar month requiring interactive communication with the patient/caregiver during the month.

The code descriptor for CPT 99454 further states "device(s) supply with daily recording(s) or programmed alter(s) transmission . . . " which has been interpreted to mean that the RPM monitoring device must be capable of generating and transmitting either (a) daily recordings of the patient's physiologic data, or (b) an alert if the patient's values fall outside pre-determined parameters. CPT 99454 is also used to report the supply of the device for daily recording or programmed alert transmissions over a 30-day period, provided monitoring occurs during at least 16 days during the 30-day period. The CPT Guidelines also state that CPT 99453 should not be reported "if monitoring is less than 16 days." If, for example, a patient receives and is educated on the RPM monitoring device, but no data is transmitted by the device, one could not bill for CPT 99453

Thus, one of the main requirements by Medicare and other insurance programs is that patients take multiple measurements each month and that health care providers consult with their patients on the measurement data that they receive from their patients. Accordingly, systems and methods of the present disclosure facilitate remote patient monitoring while also facilitating and documenting compliance with applicable healthcare guidelines. For the benefit of the patient, an exemplary gateway device 120 is provided with a status display indicator that can alert or notify the patient when peripheral monitoring data is due to be sent to their healthcare provider. And, for the benefit of the healthcare provider, the server 130 can provide a dashboard interface tracking the statuses of the delivery of peripheral monitoring data (RPM measurement data) from their patients (using gateway devices 120) and in addition to tracking the status of patient consultations.

Figure 2:
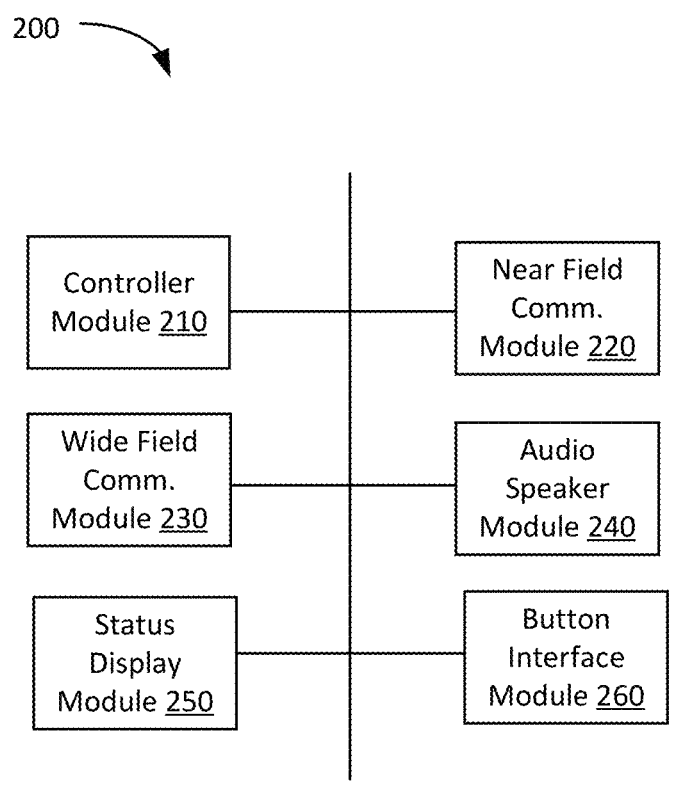
FIG. 2 is a block diagram showing modules of an exemplary gateway device according to example embodiments of the present disclosure.

FIG. 2 is a block diagram 200 showing modules of the gateway device 120 according to some example embodiments. The gateway device 120 may include an controller module 210 (e.g., a microcontroller), near field communication module 220 (e.g., Bluetooth radio), a far field communication module 230 (e.g., cellular radio), an audio speaker module 240, a status display module 250 (e.g., LED array), and a button interface module 260. The gateway device 120 can include additional components, such as a plastic enclosure, a power supply, etc., in addition to the modules displayed in FIG. 2. In general, the controller module 210 can be configured to implement software instructions stored in memory (not shown) of the controller module 210 and executed by the controller module to perform operations related to the gateway device 120. For example, the gateway device 120 can be configured to automatically connect to a set of prespecified RPM peripheral monitoring devices (for example, a Blood Pressure Monitor) via the near field communication module to receive RPM peripheral data and be configured to automatically transmit the RPM peripheral data to the server 130 via the far field communication module. The gateway device 120 may also be configured to receive messages from a local controller device (for example, a Bluetooth enabled smartphone application) via the near field communication module. And, the gateway device 120 may also be configured to receive messages from the server 130 via the far field communication module. The gateway device 120 can be configured to operate in various modes, including a normal mode, an error mode, and a debug mode. The gateway device 120 can be configured to provide a visual and/or auditory notification to users based on the RPM peripheral data measurements collected or remote messages received from the server 130. Such visual and auditory notifications can be provided by the audio speaker and status display modules 240, 250.

To provide notifications and alerts, an exemplary gateway device 120 provides a status display module 250 that provides a unique status display indicator located on an exterior side of a protective case that is configured to remind patients to take a measurement with their prescribed peripheral monitoring devices. In an exemplary implementation, the status display turns red each morning at 12 AM. This red display informs the user that they must take a measurement with each prescribed device connected to their gateway device 120.

Figure 3A:
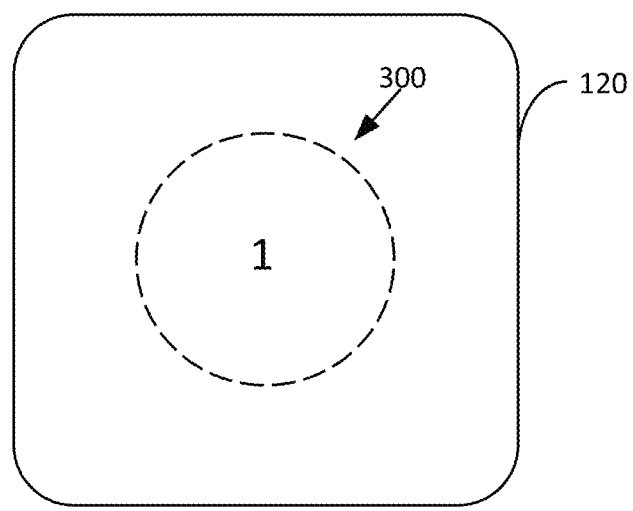
FIGS. 3A-3C show embodiments of an LED array of a status display module that is configured in a ring pattern in accordance with various embodiments of the present disclosure.
Figure 3B:
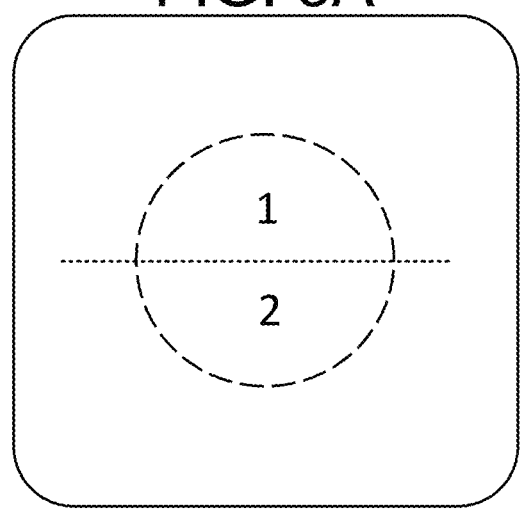

When the patient takes a measurement, the status display changes from red to green, indicating to the user that they have completed the measurement successfully and that they no longer need to take a measurement for the day. In various embodiments, the status display is partitioned based on the number of prescribed devices connected to the gateway device 110. For example, in various embodiments, the status display module 250 can include an LED array 300 (FIG. 3) configured in a ring pattern. For example, the ring of LEDs can be portioned into multiple arcs or segments corresponding to different RPM measurements (for example, the top half of the ring can correspond to a Blood Pressure measurement and the bottom half of the ring can correspond to a Weight measurement), where each arc can be in one of the above modes to indicate the status of the corresponding measurement, as represented in FIG. 3A showing a single arc, FIG. 3B showing two arcs, and FIG. 3C showing three arcs (with the dashed straight lines in FIGS. 3B and 3C being provided to help illustrate the partition portions of the LED array 300).

Figure 3C:
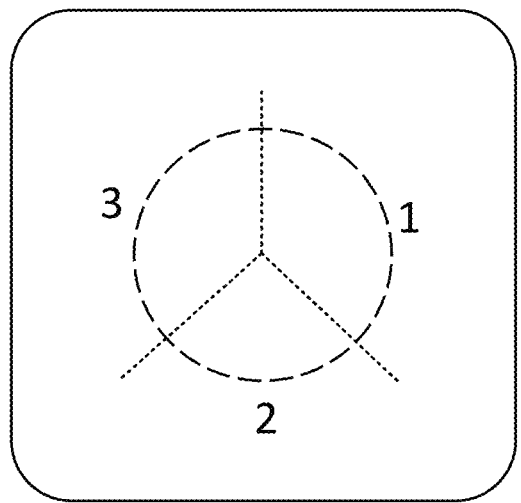

For example, in the case of FIG. 3C, Patient A is prescribed a regiment where they must take a one measurement from a blood pressure meter, one measurement from a scale, and one measurement from a pulse oximeter each day. In this case, the status display indicator will be partitioned in three equal sections (denoted as 1, 2, 3). Each partition will start red at the beginning of the day and then change to green when the measurement is taken with the respective device. In addition, the gateway device 120 may make an auditory sound each time a measurement is correctly taken and transmitted to the server 130. In another non-limiting implementation, the status display indicator may also indicate the number of measurements that are outstanding for the current day. For example, in the case of FIG. 3C, if the patient is supposed to take three measurements per day, then the LED array 300 can be divided into three partitions that may alert the patient to take the appropriate measurement at the appropriate time.

Accordingly, the status display and/or audio speaker modules 240, 250 can be configured to present or emit individual patterns indicating that an RPM measurement is required for the current day, indicating that an RPM measurement has been received, indicating that an RPM measurement has been taken but has not yet been uploaded to the server 130, indicating that an RPM has been taken and has been uploaded to the server 130, indicating that the last RPM measurement that was taken fell outside of predetermined parameters, indicating that the last two measurements taken fell outside of predetermined parameters; indicating that an error has occurred, etc. To interface with the received alert and notifications, the button interface can be pressed to acknowledge a displayed or audible alert. Additionally, the button interface can be used to send other user commands, such as commands for switching between various device modes or to turn off various visual and/or auditory notifications, among others.

FIGS. 4-17 shows exemplary graphical user interfaces to a web application hosted by the server 130 and made available to client computing devices 140 of clients of a gateway provider in order to facilitate management care and compliance with healthcare guidelines related to remote patient monitoring. In various embodiments, the web application can be displayed via a web browser of a client computing device 140 (of clients of the gateway provider) and has four layers with varying permissions. Layer 1 is an administrative layer for the gateway provider and facilitates management of the provider's clients, such as remote patient monitoring service providers and healthcare providers or facilities that use gateway devices 120 with their patients. Under Layer 1, the gateway provider can manage view information related to request orders for gateway services, fulfillment status for requested orders, and gateway service status information, as non-limiting examples. Layer 2 is an administrative layer for clients of the gateway provider, where the clients (such as remote patient monitoring service providers and/or care facilities) can view their own gateway request orders, the fulfillment status of their own gateway request orders, and the configuring of server parameters, such as the integration of a client's own management software with server 130, as non-limiting examples. Layer 3 is an administrative layer for globally managing patients of a care facility, such as setting gateway parameters across all of the gateway devices 120 associated with a group of patients. Correspondingly, Layer 4 is a patient (individual) layer for managing predetermined parameters of patients individually and to view the monitoring status of patients on an individual basis. In general, individuals who have access to Layer 1 will also have access to Layers 2, 3, and 4, where individuals with access to Layer 4 will only have access to that Layer.

Figure 4:
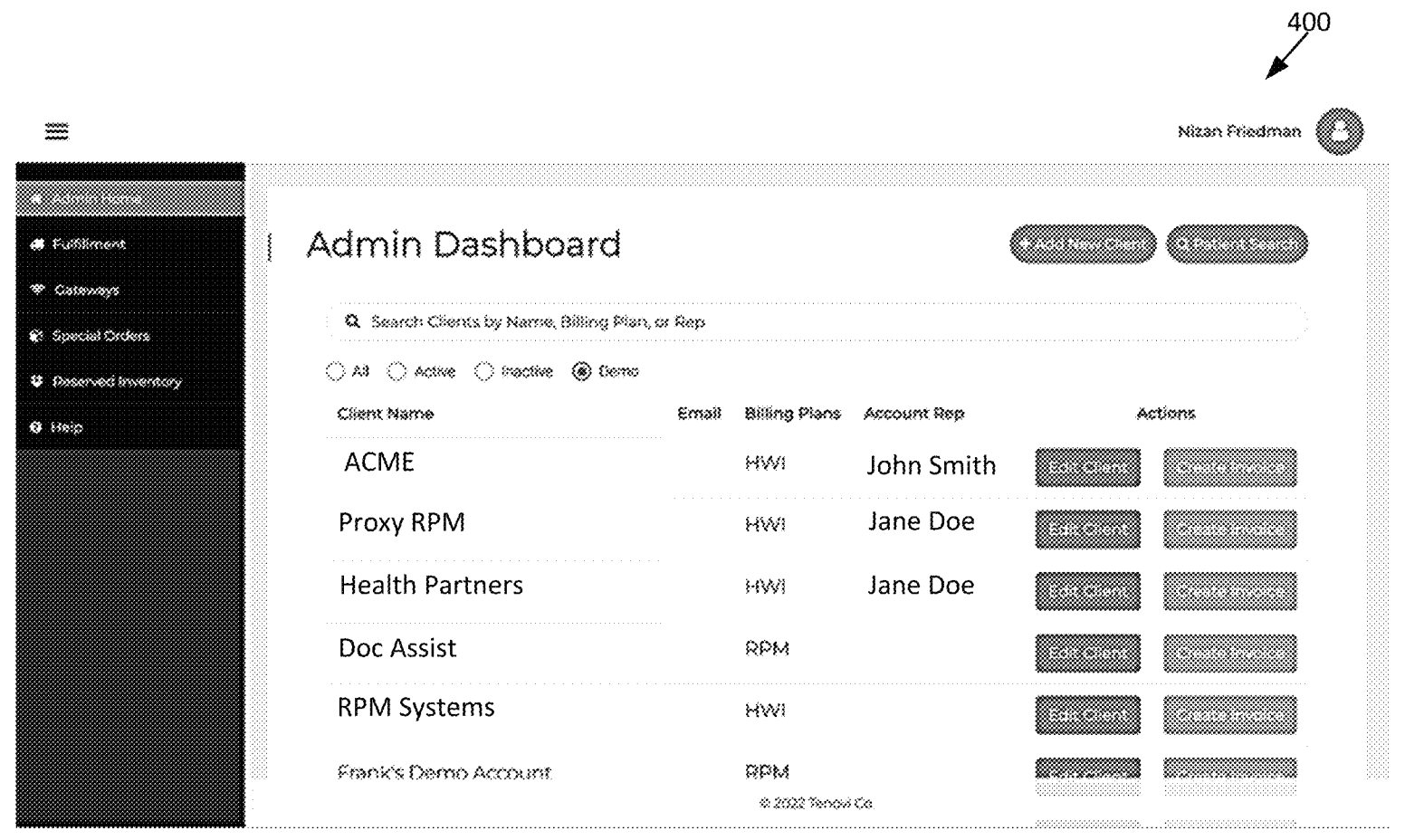
Figure 6:
Figure 7:
Figure 8:
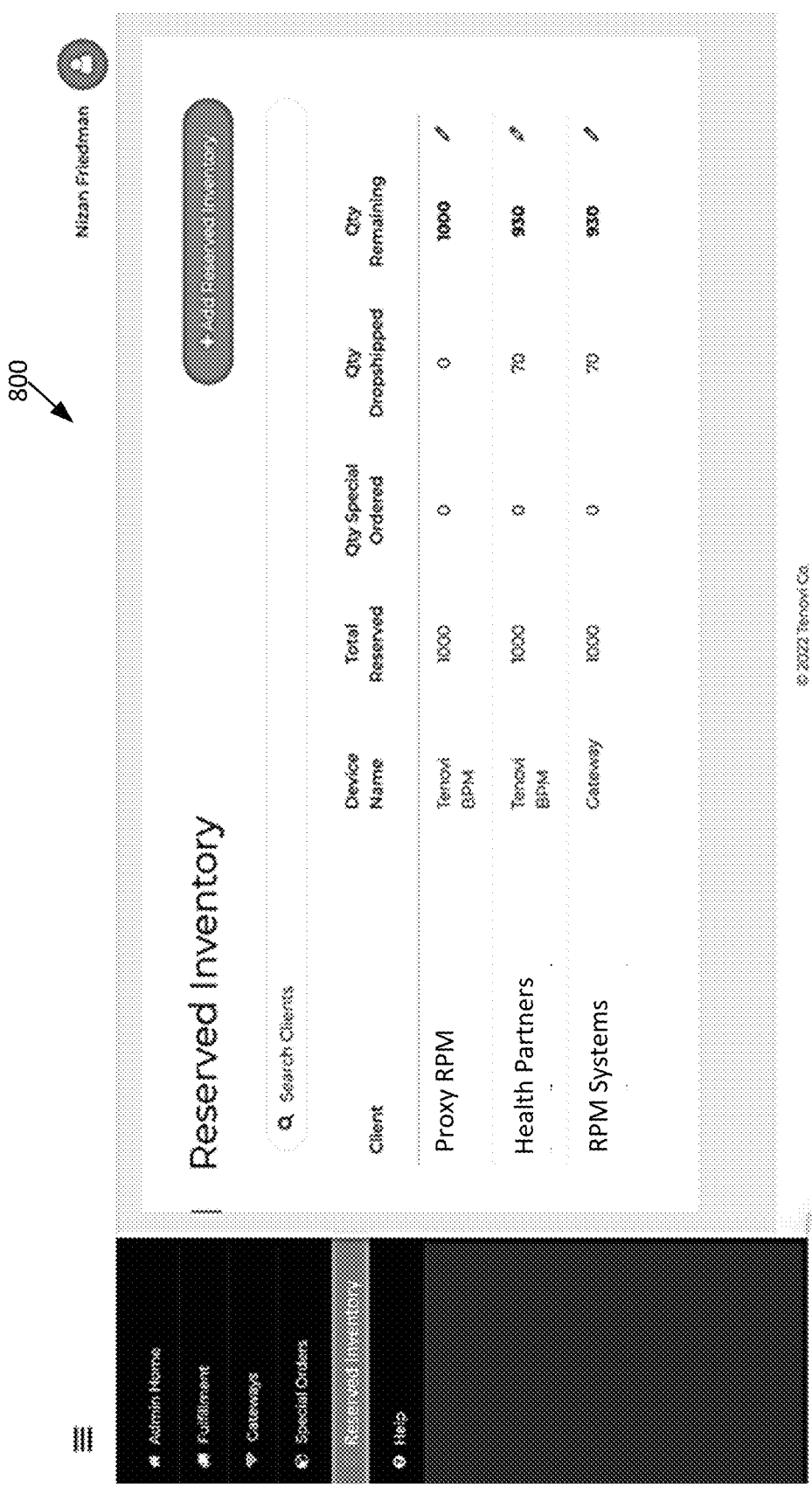

Referring now to the figures, exemplary screenshots of an embodiment of the web application is provided to illustrative aspects of functionality of the web application. FIGS. 4-8 are associated with Layer 1 permission level. In FIG. 4, an administrative dashboard 400 is shown as a frontend to the web application that lists clients of the gateway provider, where FIG. 5 provides a fulfillment dashboard 500 listing the fulfillment statuses of pending orders for gateway devices 120. FIG. 6 shows an administrative dashboard 600 providing status information on gateway devices 120 that are currently connected to the server 130. FIG. 7 is an administrative dashboard screen 700 showing the statuses of special orders that are being fulfilled, such as ship bulk orders to one location, ship a replacement device, or ship supplies connected with a device (such as Glucometer test strips). FIG. 8 shows an administrative dashboard screen 800 for reserved inventory requests and their statuses.

Figure 9:
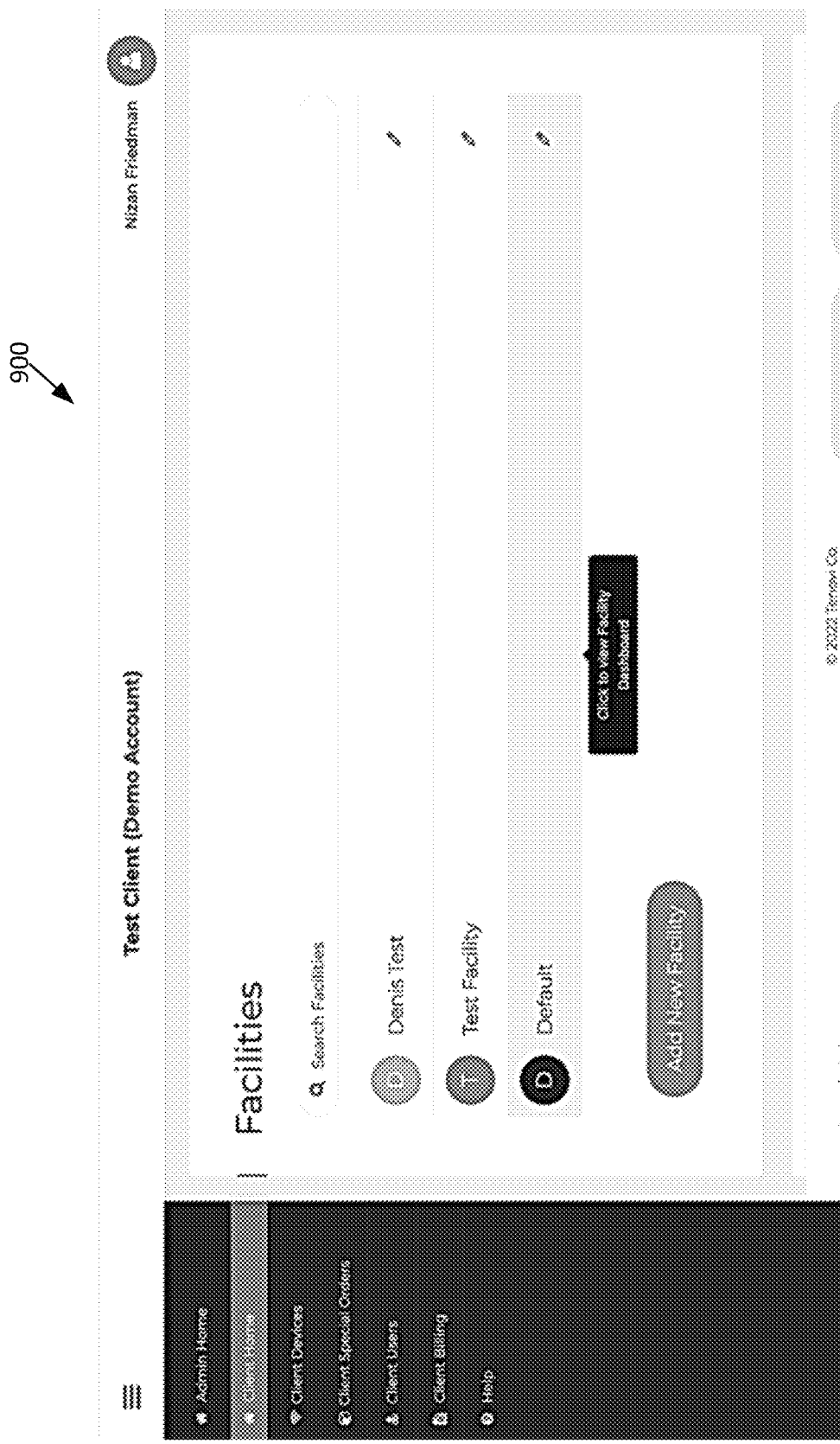
Figure 10:
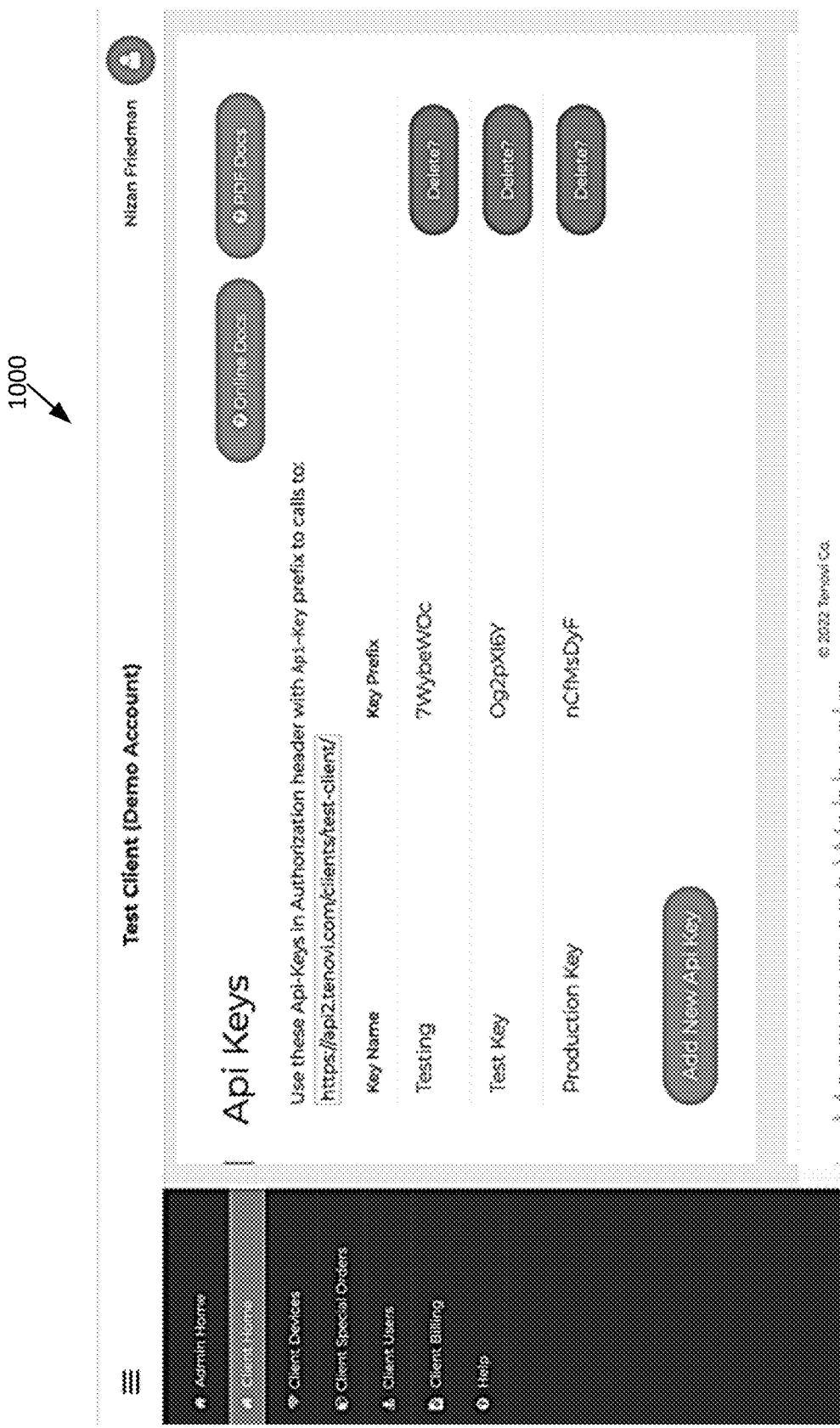

At the Layer 2 permission level, FIG. 9 shows a client dashboard screenshot 900 in which clients have the ability to: add new facilities such as physicians practices in the client home tab, view all devices and fulfillment information under the client account under the client devices tab, view special orders such as bulk orders, and supplies in the special orders tab, add admin and staff users in the client users tab, and view invoices and add a payment method in the client billing section. FIG. 10 also provides the ability to configure a client's own management software to be integrated with the server 130. Accordingly, an API dashboard 1000 is provided for clients who can generate an API key and input API webhooks for fulfillment and data transfer integration.

Figure 11:
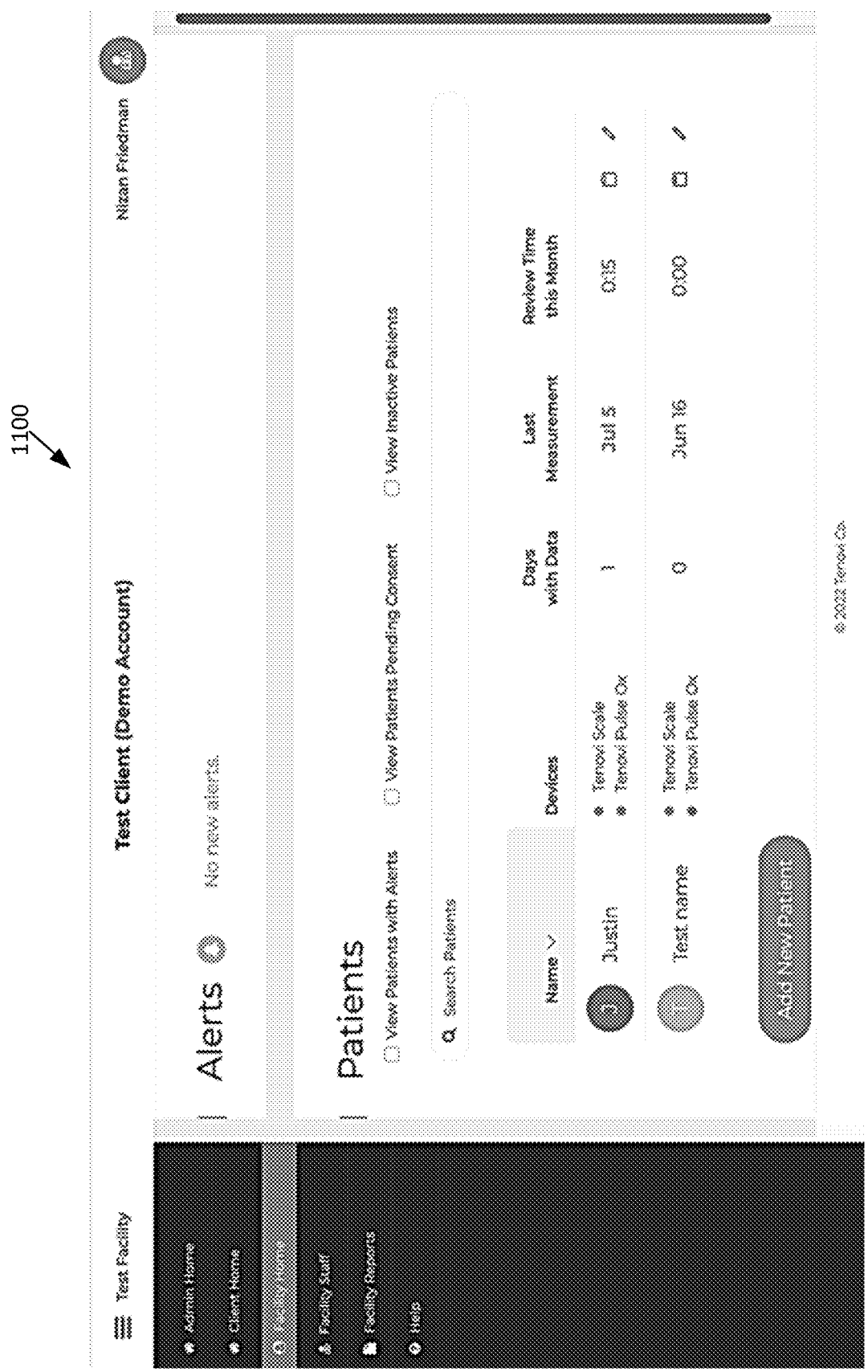
Figure 12:
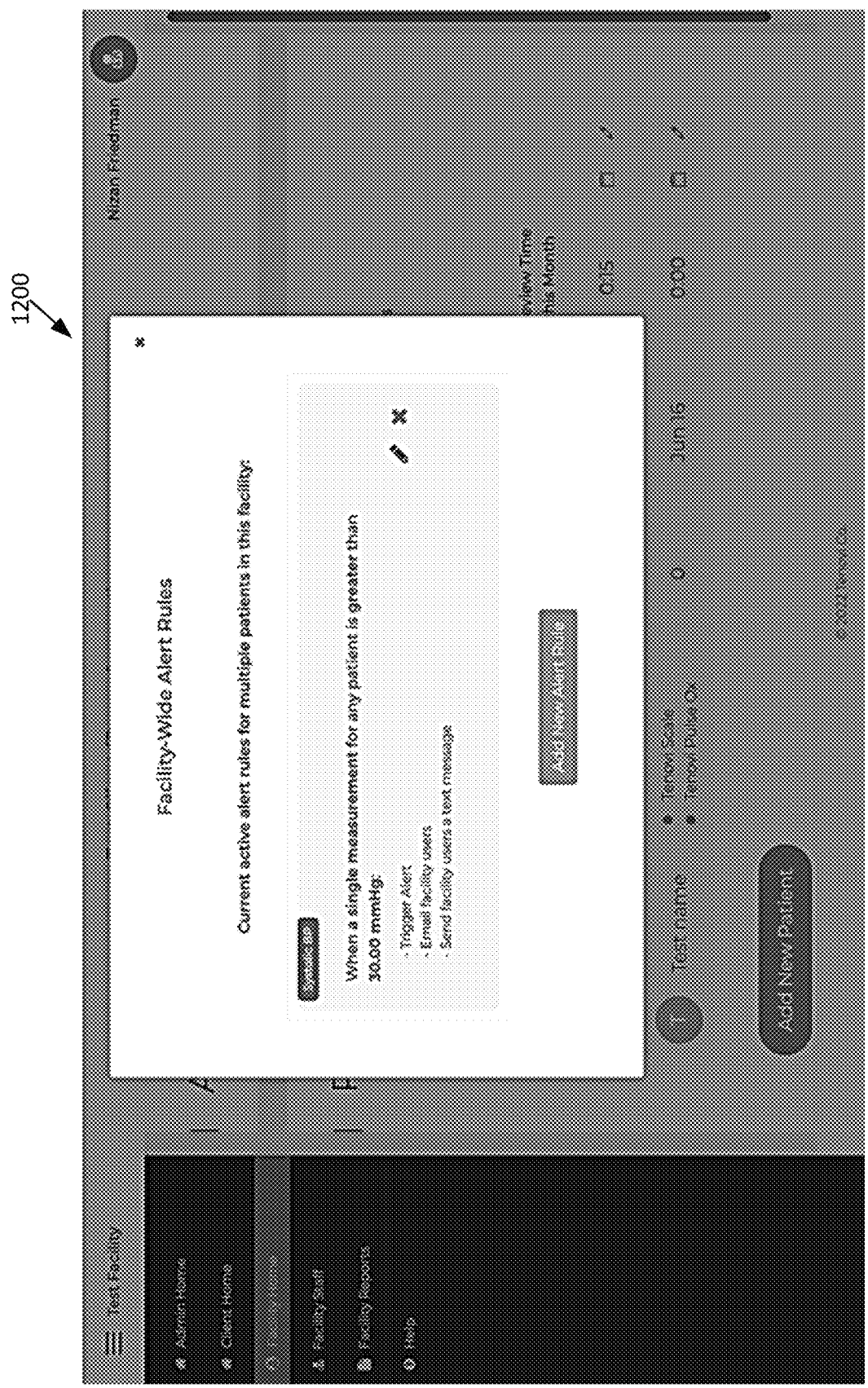

At the Layer 3 permission level, FIG. 11 shows a facility dashboard screenshot 1100 in which clients or facility staff (e.g., staff of care providers or physician offices) can add patients and assign a particular gateway device to an individual patient. Users can also sort by number of days with data for the month, last measurement taken, and number of minutes clinical staff has reviewed patient data for the month. FIG. 12 shows a facility dashboard screenshot 1200 that enables clients or facility staff to create a rules-based alert that applies to all patients in the facility account, in accordance with previous discussions above. In various embodiments, users can customize the contents of the alert messages. As such, users have the ability to text or email both the patient and the facility users when an alert has been triggered.

Figure 13:
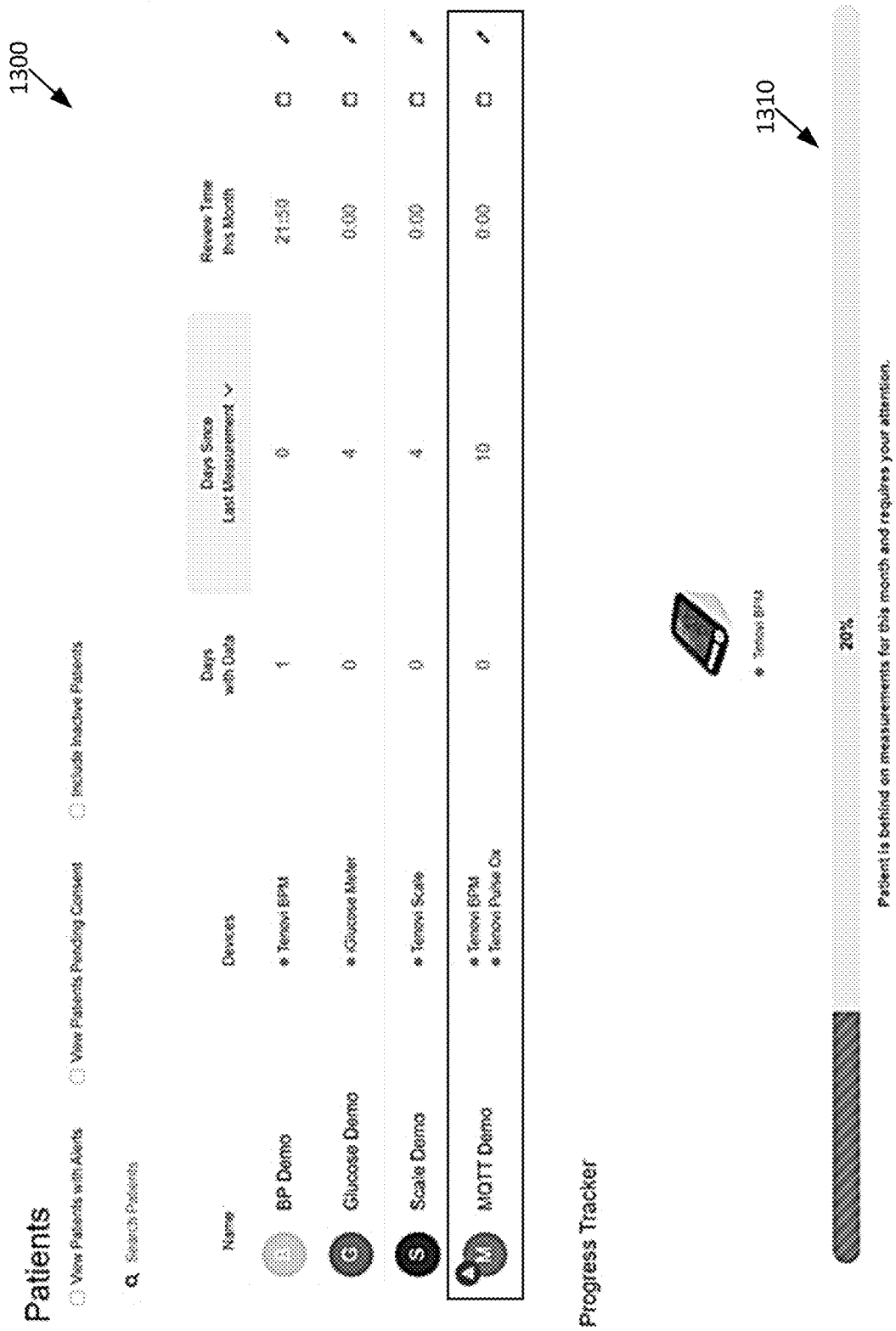

In various embodiments, a dashboard interface screen is also provided with a table listing patients who have triggered an alert, where a button interface is provided for a health care provider to acknowledge that an alert has been received and viewed. FIG. 13 shows a patients dashboard screen 1300 having a table of patients with columns indicating the number of RPM measurements taken in the current month and the number of days since the last measurement was taken. For example, the columns in the table may be color coded to indicate when the number of days since the last measurement was taken or the total number of measurements in the current month are below a threshold value. A progress bar 1310 is also provided indicating the percentage of measurements required in the current month out of a target goal in relation to the number of days remaining in that month in which those measurements can be collected. For example, the progress bar 1310 may be color coded to indicate when the ratio of the number of measurements required to the number of days remaining in the current month exceeds a threshold value. Further, the progress bar 1310 can indicate the specific device or measurement the patient needs to report a measurement.

Figure 14:
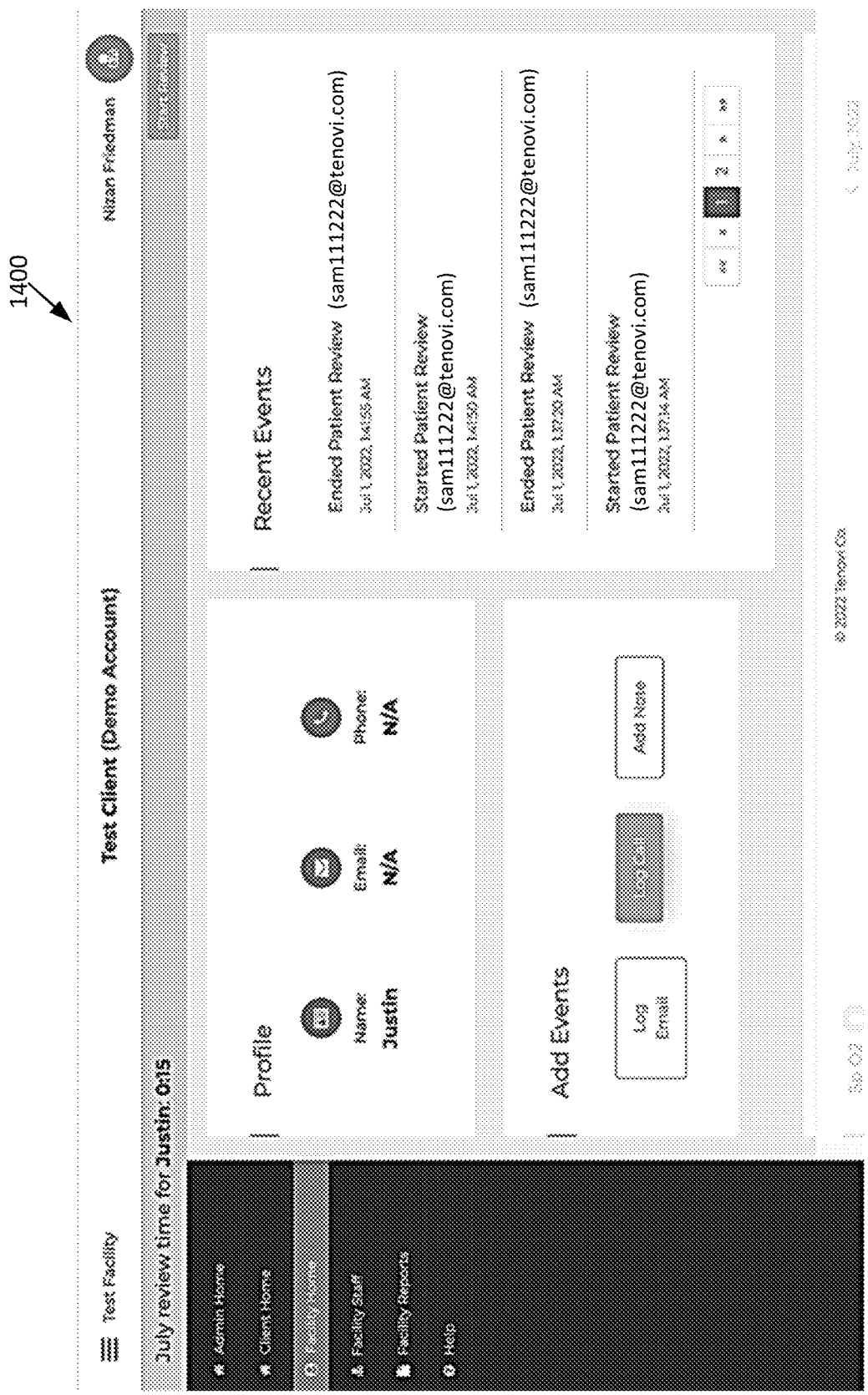
Figure 15:
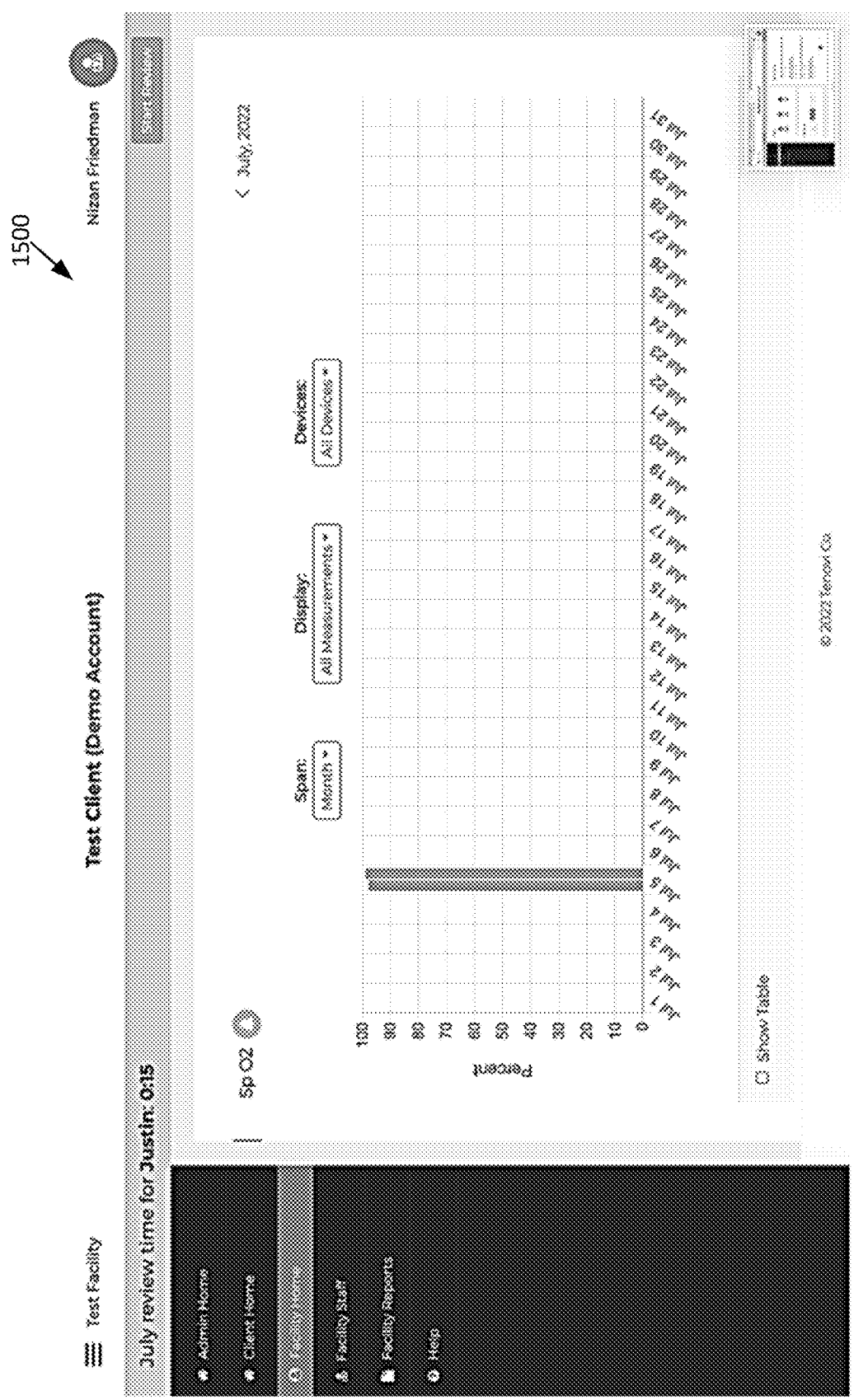
Figure 16:
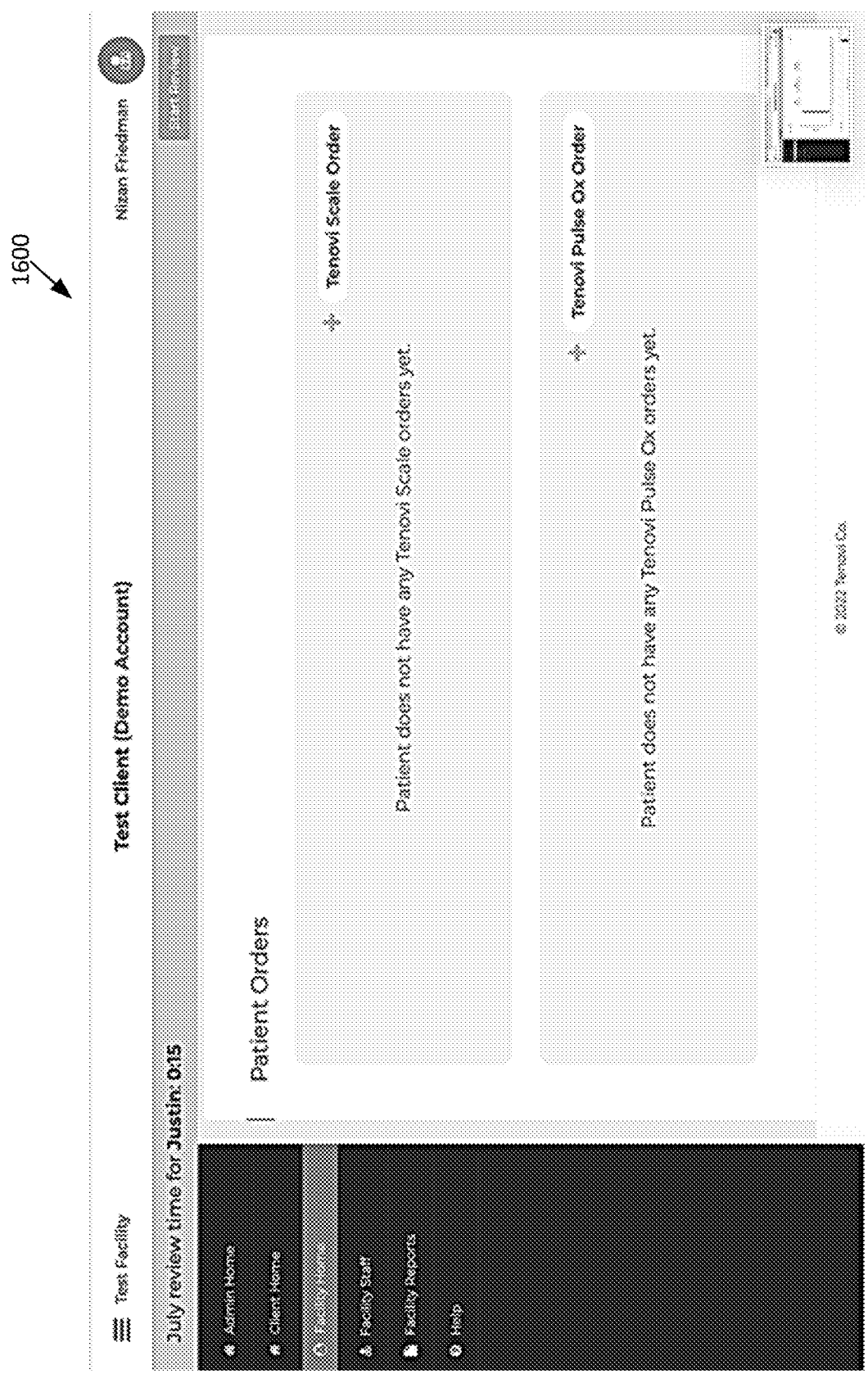
Figure 17:
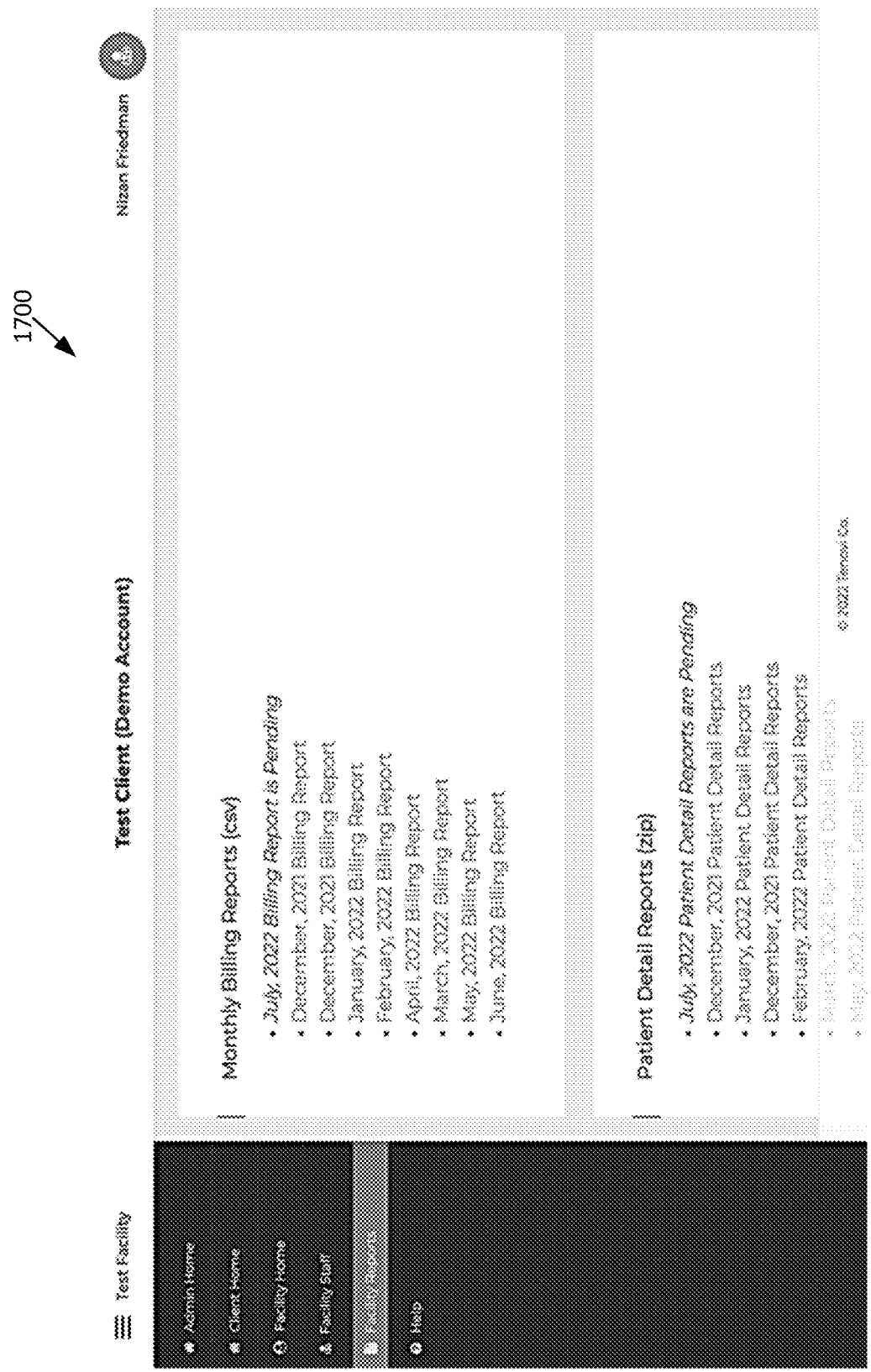

At the Layer 4 permission level, FIG. 14 shows a patient dashboard screenshot 1400 that enables clinical staff employed by the client or a respective facility to log events such as emails, calls, and notes, which are all recorded in a patient log. FIG. 15 shows another screenshot of the patient dashboard 1500 that enables users to view physiological measurement data by graphical or table format and to sort the data by various metrics such as date range. FIG. 16 shows another screenshot of the patient dashboard 1600 that enables clinical staff to add patient orders such as the time of day or frequency in which measurements should be taken. FIG. 17 is another screenshot of the patient dashboard 1700 that allows clients or facility staff to view different types of facility reports, such as a monthly billing report that provides a breakdown of applicable CPT insurance reimbursement codes per patient based on the number of measurements taken by the patient each month and the number of minutes of review time completed by clinical staff. As such, logic of the server 130 can track which CPT codes can be billed for a particular month for individual patients based on the RPM measurement data obtained from the gateway devices of individual patients and the care management reports provided by care facilities.

Figure 18:
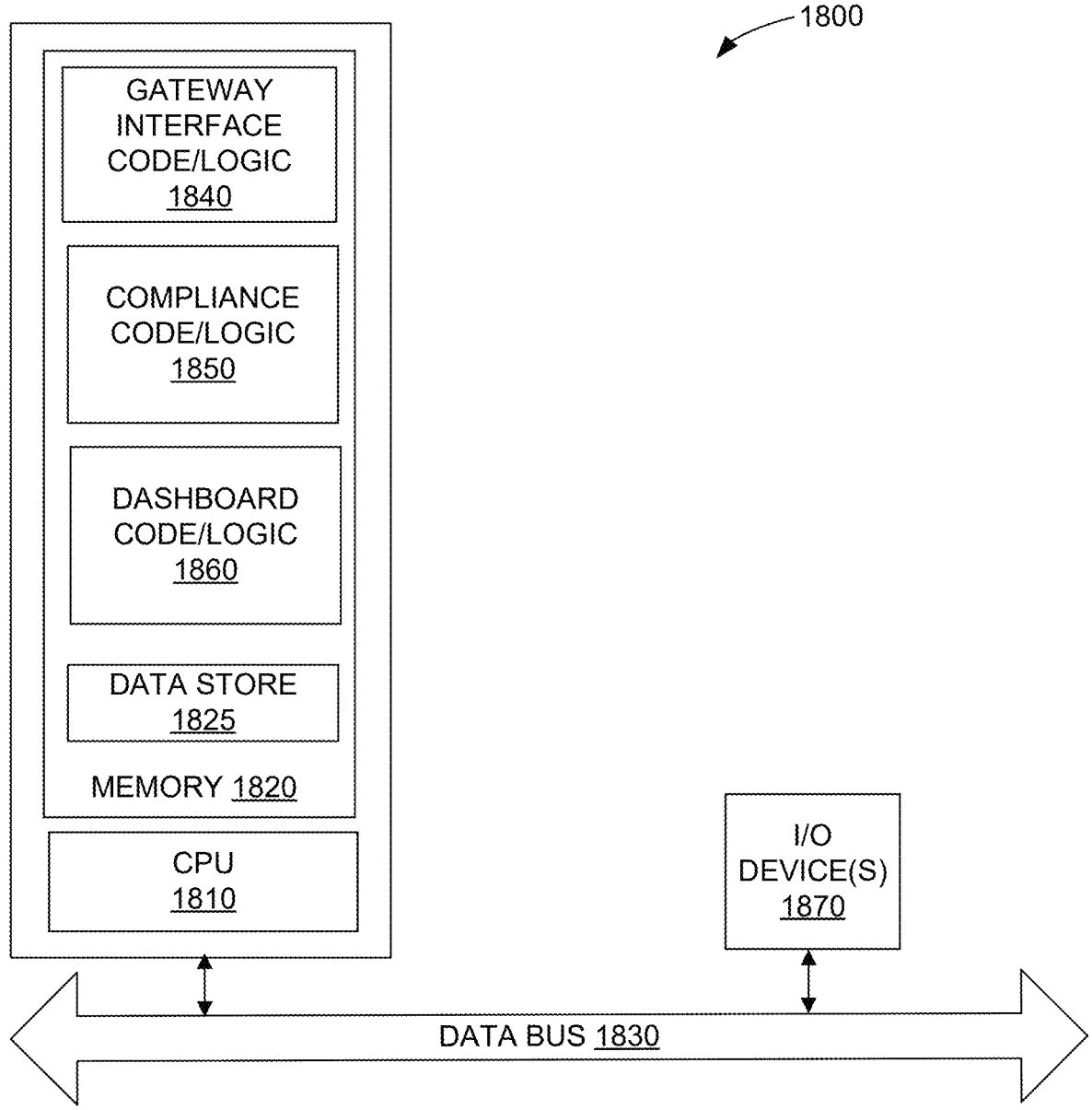
FIG. 18 is a block diagram illustrating an exemplary computing system or device that can be utilized for systems and methods of the present disclosure.

FIG. 18 is a block diagram illustrating an exemplary computing system or device 1800 (e.g., server 130) that can be utilized for systems and methods of the present disclosure. Computing system 1800 includes at least one processor, e.g., a central processing unit (CPU), 1810 coupled to memory elements 1820 through a data bus 1830 or other suitable circuitry. Computing system 1800 stores program code within memory elements 1820. Processor 1810 executes the program code accessed from memory elements 1820 via the data bus 1830. In one aspect, computing system 1800 may be implemented as a computer or other data processing system, including tablets, smartphones, or server computers that are accessed using browsers at client computers. It should be appreciated, however, that computing system 1800 can be implemented in the form of any system including a processor and memory that is capable of performing the functions described within this disclosure.

Memory elements 1820 include one or more physical memory devices such as, for example, a local memory and one or more storage devices. Local memory refers to random access memory (RAM) or other non-persistent memory device(s) generally used during actual execution of the program code. Storage device may be implemented as a hard disk drive (HDD), solid state drive (SSD), or other persistent data storage device. Computing system 1800 may also include one or more cache memories (not shown) that provide temporary storage of at least some program code in order to reduce the number of times program code must be retrieved from storage device during execution.

Stored in the memory 1820 are both data and several components that are executable by the processor 1810. In particular, stored in the memory 1820 and executable by the processor 1810 are code for interacting and interfacing with a gateway device 120 ("gateway interface" code/logic 1840), code for monitoring compliance of received RPM measurements from the gateway device 120 with predetermined parameters related to healthcare guidelines ("compliance" code/logic 1850), and code for presenting a web application interface (e.g. dashboard frontend interface) for accessing the RPM measurements and setting the predetermined parameters and related gateway configurations ("dashboard" code/logic 1860). Also stored in the memory 1820 may be a data store 1825 and other data. The data store 1825 can include an electronic repository or database relevant to RPM peripheral data and related predetermined parameters. In addition, an operating system may be stored in the memory 1820 and executable by the processor 1810.

Input/output (I/O) devices 1870 such as a keyboard, a display device, and a pointing device may optionally be coupled to computing system 1800. The I/O devices may be coupled to computing system 1800 either directly or through intervening I/O controllers. A network adapter may also be coupled to computing system to enable computing system to become coupled to other systems, computer systems, remote printers, and/or remote storage devices through intervening private or public networks. Modems, cable modems, Ethernet cards, and wireless transceivers are examples of different types of network adapter that may be used with computing system 1800.

Figure 19:
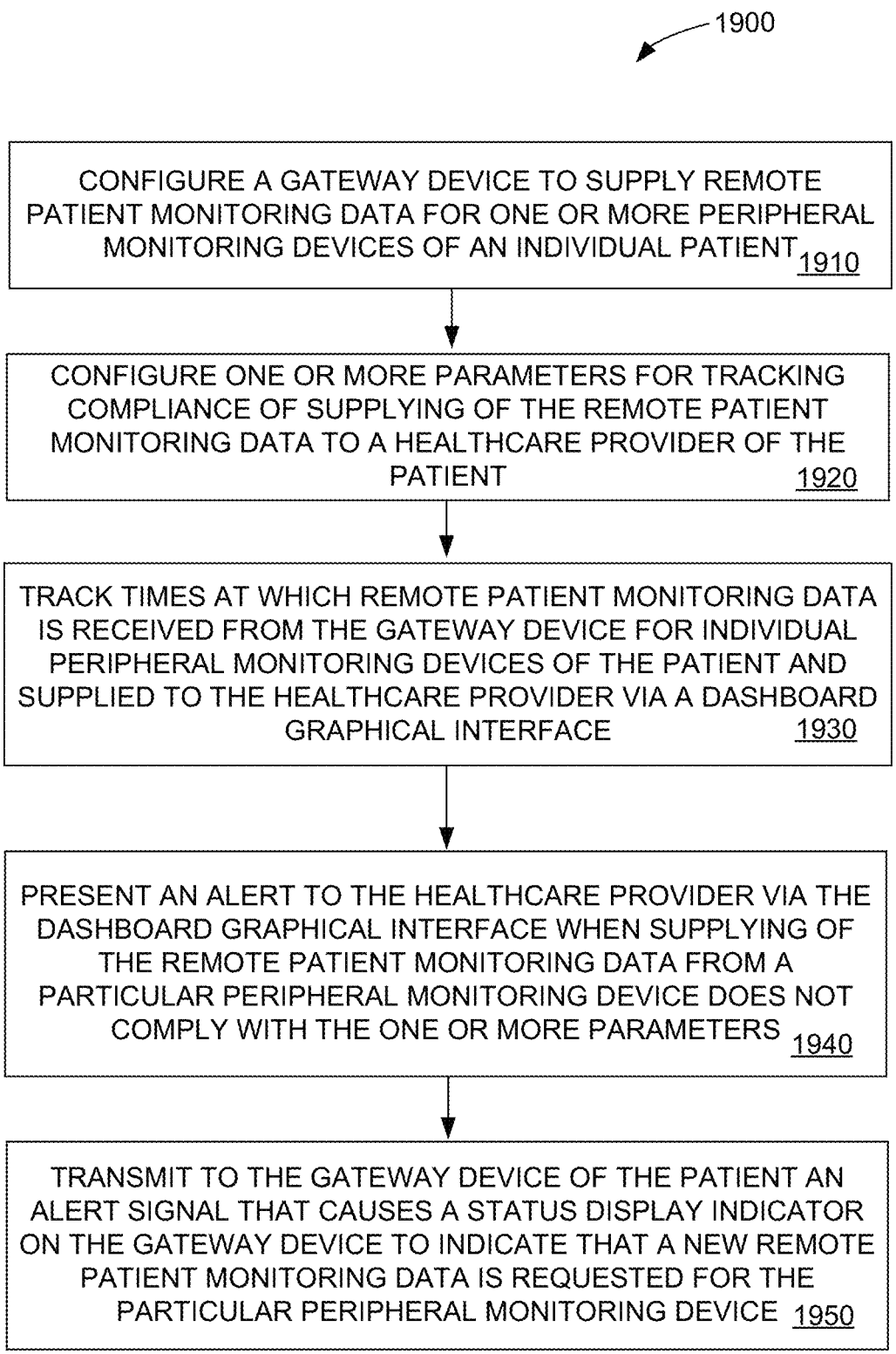
FIG. 19 is a flow chart illustrating an exemplary method that may be implemented by computing system described with reference to FIG. 18 in accordance with various embodiments of the present disclosure.

FIG. 19 is a flow chart illustrating an exemplary method 1900 that may be implemented by computing system 1800 (e.g., server 130) described with reference to FIG. 18. Computing system 1800 may execute, or include, an architecture as described generally with reference to FIG. 18. In block 1910, the computing system 1800 may configure a gateway device 120 to supply remote patient monitoring data for one or more peripheral monitoring devices 110 of an individual patient, wherein the gateway device 120 is located remotely from the computing device 1800 and the remote patient monitoring data comprises measurement values of the one or more peripheral monitoring devices 110. In block 1920, the computing system 1800 may configure one or more parameters for tracking compliance of supplying of the remote patient monitoring data to a healthcare provider of the patient. In block 1930, the computing system may track times at which remote patient monitoring data is received from the gateway device 120 for individual peripheral monitoring devices 110 of the patient and supplied to the healthcare provider via a dashboard graphical interface. In block 1940, the computing system 1800 may present an alert to the healthcare provider via the dashboard graphical interface when supplying of the remote patient monitoring data from a particular peripheral monitoring device 110 does not comply with the one or more parameters. Correspondingly, in block 1950, the computing system 1800 may transmit to the gateway device 120 of the patient an alert signal that causes a status display indicator on the gateway device 120 to indicate that a new remote patient monitoring data is requested for the particular peripheral monitoring device 110.

Computer program code for carrying out operations of the present disclosure may be written in a variety of computer programming languages. The program code may be executed entirely on at least one computing device (or processor), as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer.

It will be understood that each block of the flowchart illustrations and block diagrams and combinations of those blocks can be implemented by computer program instructions and/or means. These computer program instructions may be provided to a processor of a general purpose computer, special purpose computer, application specific integrated circuit (ASIC), or other programmable data processing apparatus to produce a machine, such that the instructions, which execute via the processor of the computer or other programmable data processing apparatus, create means for implementing the functions specified in the flowcharts or block diagrams.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the disclosure. All such modifications and variations are intended to be included herein within the scope of this disclosure and protected by the following claims.

The invention claimed is:

1. A method comprising:
configuring, by a computing device, a gateway device to supply remote patient monitoring data for one or more peripheral monitoring devices of an individual patient, wherein the gateway device is located remotely from the computing device and the remote patient monitoring data comprises measurement values of the one or more peripheral monitoring devices;
configuring, by the computing device, one or more parameters for tracking compliance of supplying of the remote patient monitoring data to a healthcare provider of the patient;
tracking, by the computing device, times at which remote patient monitoring data is received from the gateway device for individual peripheral monitoring devices of the patient and supplied to the healthcare provider via a dashboard graphical interface;
displaying, by the computing device, an alert to the healthcare provider via the dashboard graphical interface when supplying of the remote patient monitoring data from a particular peripheral monitoring device does not comply with the one or more parameters; and
transmitting, by the computing device, to the gateway device of the patient an alert signal that causes a status display indicator on the gateway device to indicate that a new remote patient monitoring data is requested for the particular peripheral monitoring device, wherein the status display indicator of the gateway device is configured to indicate a number of measurements of remote patient monitoring data that is due to be taken by the patient for a current day, wherein the status display indicator comprises an LED array configured in a circular pattern that is portioned into arc segments that illuminate corresponding to the number of measurements or illuminate corresponding to a number of peripheral monitoring devices that are connected to the gateway device.

2. The method of claim 1, wherein the one or more parameters correspond to guidelines set by a healthcare insurance provider.

3. The method of claim 1, wherein the one or more peripheral monitoring devices comprise a plurality of peripheral monitoring devices of different types, wherein each of the different types of peripheral monitoring devices measure a different physiological parameter of the patient.

4. The method of claim 3, wherein the gateway device is configured to connect with a plurality of different types of peripheral monitoring devices, wherein the gateway device does not connect to a plurality of peripheral monitoring devices of the same type.

5. The method of claim 3, wherein the gateway device connects with a particular peripheral monitoring device if the particular peripheral monitoring device is included in a restricted list of peripheral monitoring devices, wherein the restricted list does not contain multiple peripheral monitoring devices of the same type, the method further comprising:
adding, by the computing device, the particular peripheral monitoring device to the restricted list of peripheral monitoring devices for the gateway device.

6. The method of claim 5, wherein the gateway device scans for another gateway device in range of the gateway device and uses the restricted list if another gateway device is detected, wherein the gateway device does not use the restricted list if another gateway device is not detected.

7. The method of claim 5, wherein the gateway device indicates that the gateway device is using the restricted list to connect with peripheral monitoring devices via the status display indicator on the gateway device.

8. The method of claim 1, wherein communications between the gateway device and the computing device comprise cellular communications.

9. The method of claim 1, wherein the alert signal further causes an audio speaker of the gateway device to emit an audio alert to indicate that the new remote patient monitoring data is requested for the particular peripheral monitoring device.

10. The method of claim 1, wherein an arc segment of the status display indicator changes color after measurement data is transmitted from the gateway device to the computing device.

11. A system comprising:
a processor of a computing device; and
a memory in communication with the processor, the memory storing program instructions, the processor operative with the program instructions to perform the operations of:
configuring a gateway device to supply remote patient monitoring data for one or more peripheral monitoring devices of an individual patient, wherein the gateway device is located remotely from the computing device and the remote patient monitoring data comprises measurement values of the one or more peripheral monitoring devices;
configuring one or more parameters for tracking compliance of supplying of the remote patient monitoring data to a healthcare provider of the patient;
tracking times at which remote patient monitoring data is received from the gateway device for individual peripheral monitoring devices of the patient and supplied to the healthcare provider via a dashboard graphical interface;
displaying an alert to the healthcare provider via the dashboard graphical interface when supplying of the remote patient monitoring data from a particular peripheral monitoring device does not comply with the one or more parameters; and
transmitting to the gateway device of the patient an alert signal that causes a status display indicator on the gateway device to indicate that a new remote patient monitoring data is requested for the particular peripheral monitoring device, wherein the status display indicator of the gateway device is configured to indicate a number of measurements of remote patient monitoring data that is due to be taken by the patient for a current day, wherein the status display indicator comprises an LED array configured in a circular pattern that is portioned into arc segments that illuminate corresponding to the number of measurements or illuminate corresponding to a number of peripheral monitoring devices that are connected to the gateway device.

12. The system of claim 11, wherein the one or more parameters correspond to guidelines set by a healthcare insurance provider.

13. The system of claim 11, wherein the one or more peripheral monitoring devices comprise a plurality of peripheral monitoring devices of different types, wherein each of the different types of peripheral monitoring devices measure a different physiological parameter of the patient.

14. The system of claim 13, further comprising the gateway device, wherein the gateway device is configured to connect with a plurality of different types of peripheral monitoring devices, wherein the gateway device does not connect to a plurality of peripheral monitoring devices of the same type.

15. The system of claim 13, further comprising the gateway device, wherein the gateway device is configured to connect with a particular peripheral monitoring device if the particular peripheral monitoring device is included in a restricted list of peripheral monitoring devices, wherein the restricted list does not contain multiple peripheral monitoring devices of the same type, wherein the computing device is configured to add the particular peripheral monitoring device to the restricted list of peripheral monitoring devices for the gateway device.

16. The system of claim 15, wherein the gateway device is adapted to scan for another gateway device in range of the gateway device and use the restricted list if another gateway device is detected, wherein the gateway device is configured to not use the restricted list if another gateway device is not detected.

17. The system of claim 15, wherein the gateway device is configured to indicate that the gateway device is using the restricted list to connect with peripheral monitoring devices via a status display indicator on the gateway device.

18. The system of claim 11, wherein communications between the gateway device and the computing device comprise cellular communications.

19. The system of claim 11, wherein an arc segment of the status display indicator changes color after measurement data is transmitted from the gateway device to the computing device.

20. A non-transitory computer readable medium comprising machine readable instructions that, when executed by a processor of a computing device, cause the computing device to at least:

configure a gateway device to supply remote patient monitoring data for one or more peripheral monitoring devices of an individual patient, wherein the gateway device is located remotely from the computing device and the remote patient monitoring data comprises measurement values of the one or more peripheral monitoring devices;

configure one or more parameters for tracking compliance of supplying of the remote patient monitoring data to a healthcare provider of the patient;

track times at which remote patient monitoring data is received from the gateway device for individual peripheral monitoring devices of the patient and supplied to the healthcare provider via a dashboard graphical interface;

display an alert to the healthcare provider via the dashboard graphical interface when supplying of the remote patient monitoring data from a particular peripheral monitoring device does not comply with the one or more parameters; and transmit to the gateway device of the patient an alert signal that causes a status display indicator on the gateway device to indicate that a new remote patient monitoring data is requested for the particular peripheral monitoring device, wherein the status display indicator of the gateway device is configured to indicate a number of measurements of remote patient monitoring data that is due to be taken by the patient for a current day, wherein the status display indicator comprises an LED array configured in a circular pattern that is portioned into arc segments that illuminate corresponding to the number of measurements or illuminate corresponding to a number of peripheral monitoring devices that are connected to the gateway device.

* * * * *